Figure 1:
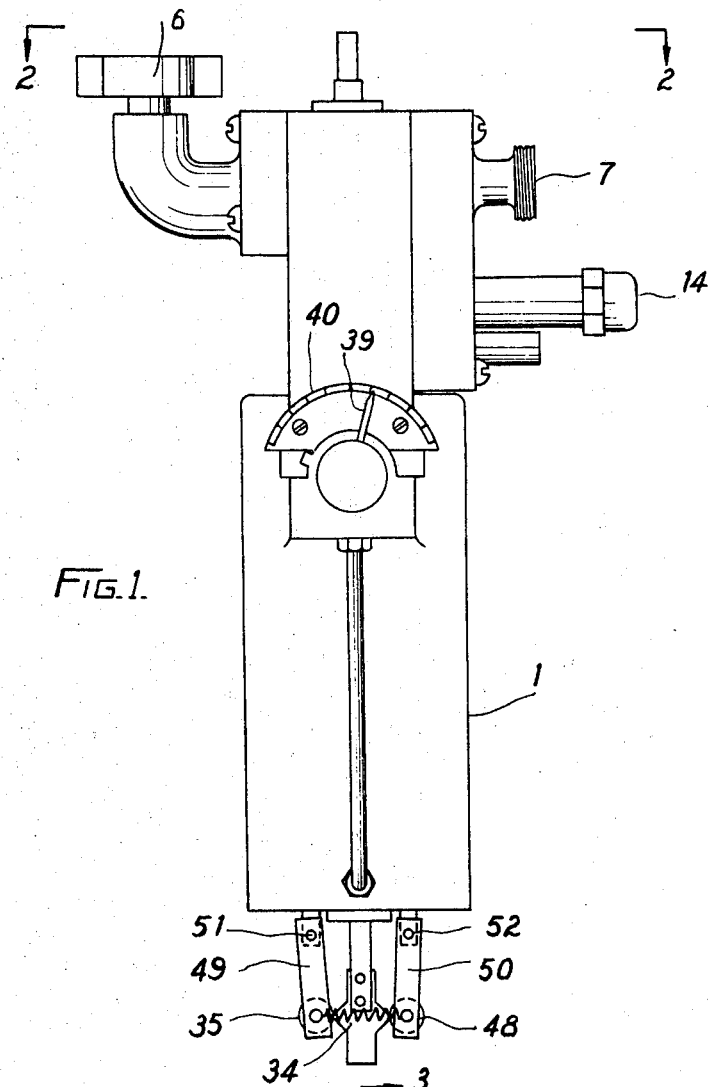

United States Patent

[11] 3,565,113

[72] Inventor John L. Power
"Moorak" Ashmore Road, Benowa via Southport, Queensland, Australia
[21] Appl. No. 758,993
[22] Filed Sept. 11, 1968
[45] Patented Feb. 23, 1971
[32] Priority Sept. 25, 1967
[33] Australia
[31] 27,662

[54] TIMING DEVICE FOR THE CONTROL OF FLUID FLOW
22 Claims, 8 Drawing Figs.

[52] U.S. Cl. .................................................. 137/624.14
[51] Int. Cl. ............................................. F16k 31/363
[50] Field of Search ..................................... 137/624.14, 624.11, 624.13, 624.18, 624.2; 239/66

[56] References Cited
UNITED STATES PATENTS

| | | | |
|---|---|---|---|
| 2,793,908 | 5/1957 | Carver | 137/624.14X |
| 3,183,933 | 5/1905 | Whitlock | 137/624.18 |
| 3,241,569 | 3/1966 | Sully | 137/624.13 |
| 2,203,832 | 6/1940 | Malburg | 137/99 |
| 3,380,477 | 4/1968 | Wenger | 137/624.14 |

*Primary Examiner*—Alan Cohan
*Attorney*—Beveridge & De Grandi

ABSTRACT: A flow control flow device having a body with an inlet and an outlet, a passageway therebetween and a shutoff valve controlling flow in the passage between the inlet and outlet. Actuation of the valve to stop flow between the inlet and outlet is achieved through a pressure responsive piston mechanism reciprocable in a chamber and being connected through a lost motion mechanism, to the valve to close the valve after a predetermined number of reciprocations determined by a pawl and ratchet mechanism. During normal reciprocation of the piston mechanism, the valve reciprocates therewith while however remaining in an open position permitting flow between the inlet and the outlet. Fluid is supplied in and exhausted from the chamber on opposite sides of the piston mechanism through flow passages communicating with the valve passage and being alternately opened and closed by another valve attached to the shutoff valve to reciprocate therewith during normal reciprocation of the piston mechanism. Upon the conclusion of a predetermined number of reciprocations of the piston mechanism, which corresponds with the conclusion of the timing movement of the ratchet, a slide valve connected to the ratchet is released by an associated detent mechanism to prevent fluid flow into one side of the chamber while permitting fluid to flow into the other side of the chamber to actuate the piston mechanism in one direction for closing the shutoff valve. To initiate a new cycle, the slide valve mechanism is depressed and rotated to a preset position to engage the ratchet and pawl with the detent mechanism holding the ratchet and pawl engaged until the expiration of the cycle.

INVENTOR:
JOHN LAWRENCE POWER
by
BROWNE, SCHUYLER & BEVERIDGE
Attorneys

INVENTOR:
JOHN LAWRENCE POWER
by
BROWNE, SCHUYLER & BEVERIDGE
Attorneys

TIMING DEVICE FOR THE CONTROL OF FLUID FLOW

This invention relates to a timing device for the control of fluid flow.

It is an object of the invention to provide a device which may be connected in a passage containing fluid under pressure and which is adapted after a predetermined period to shut off or restrict the flow of fluid through said passage. A device of such a character may be employed, for example, for cutting off automatically the supply of water or other liquid to an irrigation system or to a domestic garden sprinkler after a predetermined period.

The invention resides broadly in a device comprising a body with a fluid inlet thereto, a fluid outlet therefrom and a way from the inlet to the outlet, a reciprocatory member in said body, means whereby passage of fluid through said body causes intermittent motion of said member, a control member adapted to be moved in increments by reciprocation of said member, a valve in said body and means for causing said valve to move from an open to a closed position to close said way when said control member has been moved by a predetermined number of increments.

Figure 2:
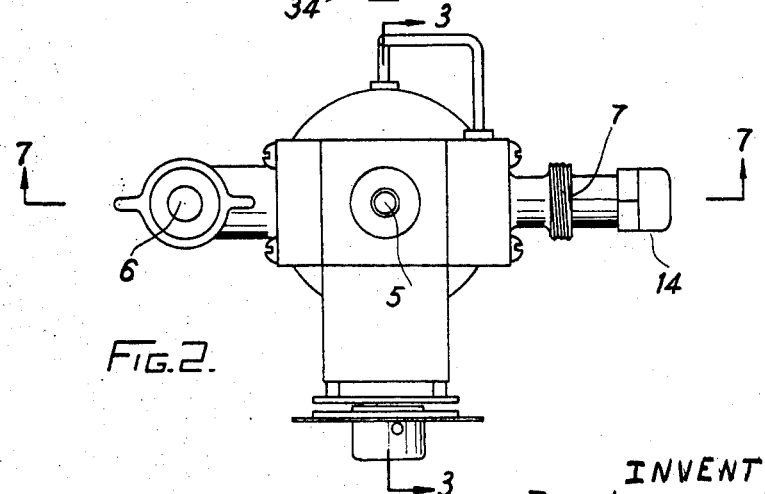
Figure 3:
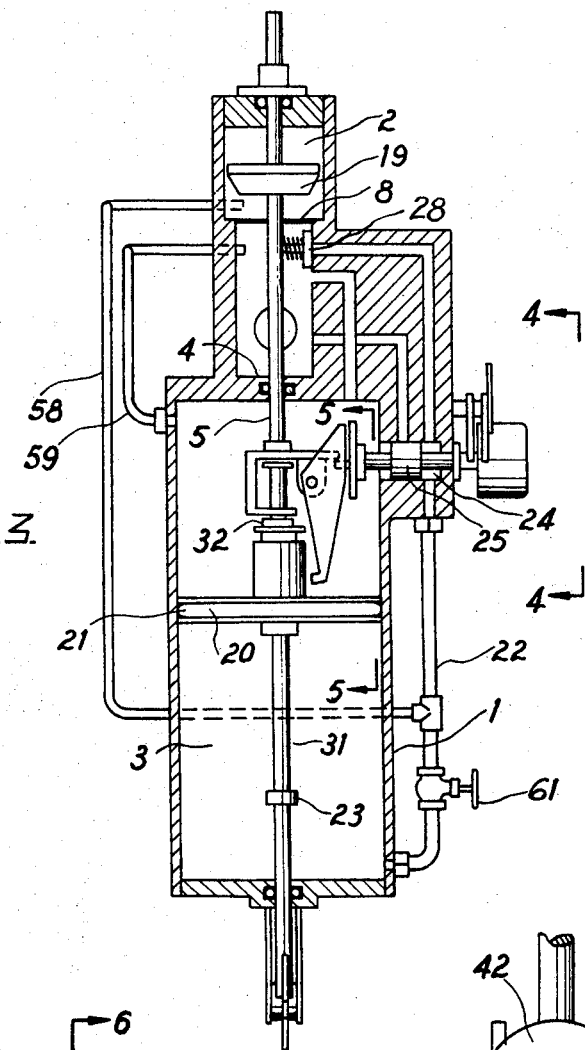
Figure 4:
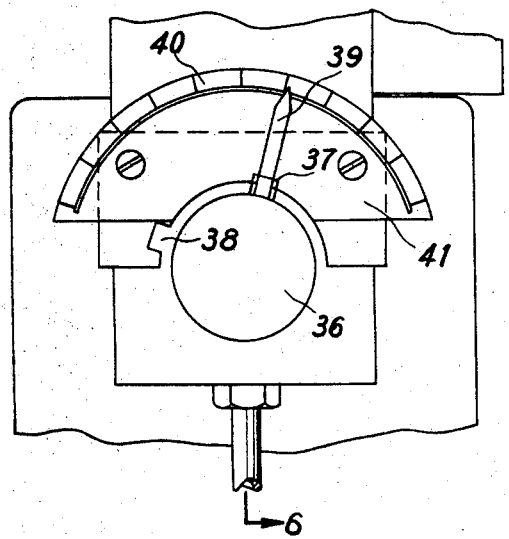
Figure 5:
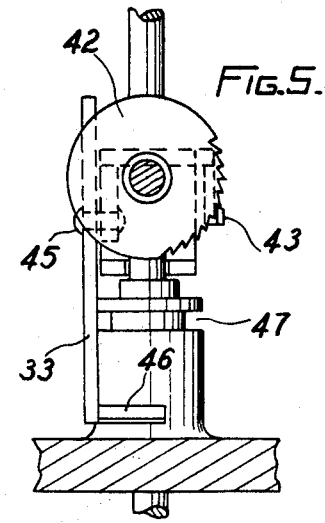
Figure 7:
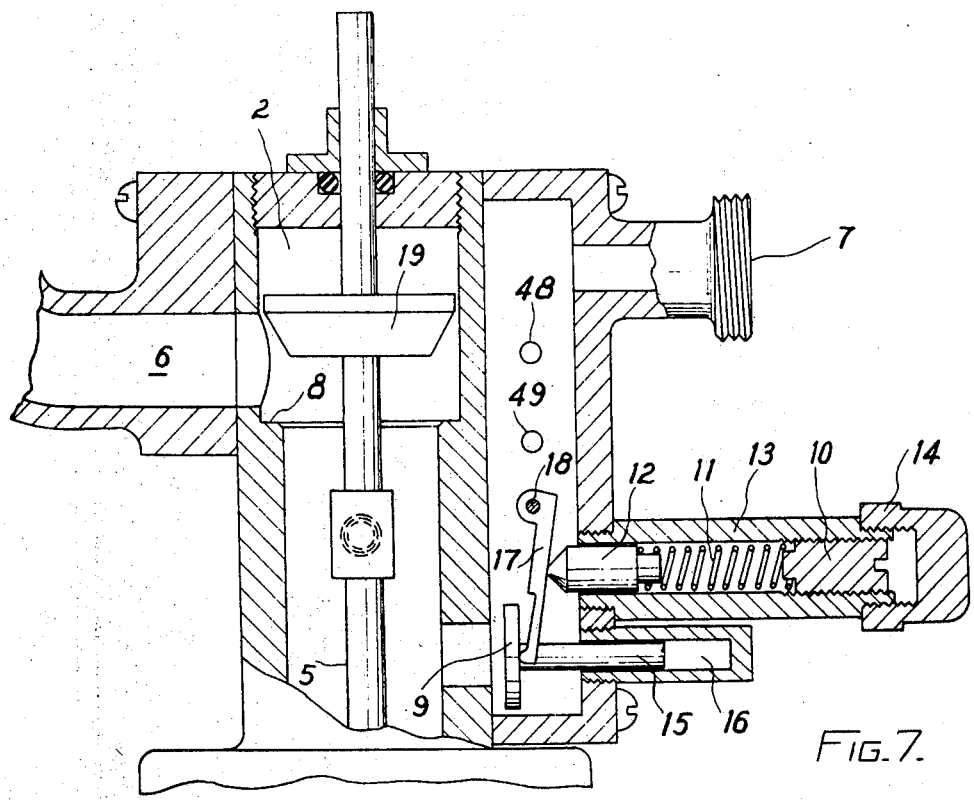
Figure 6:
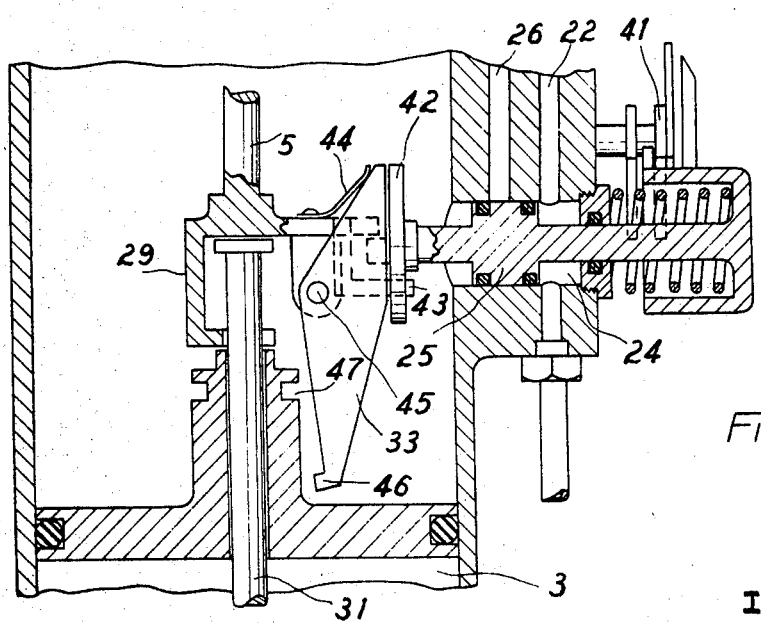
Figure 8:
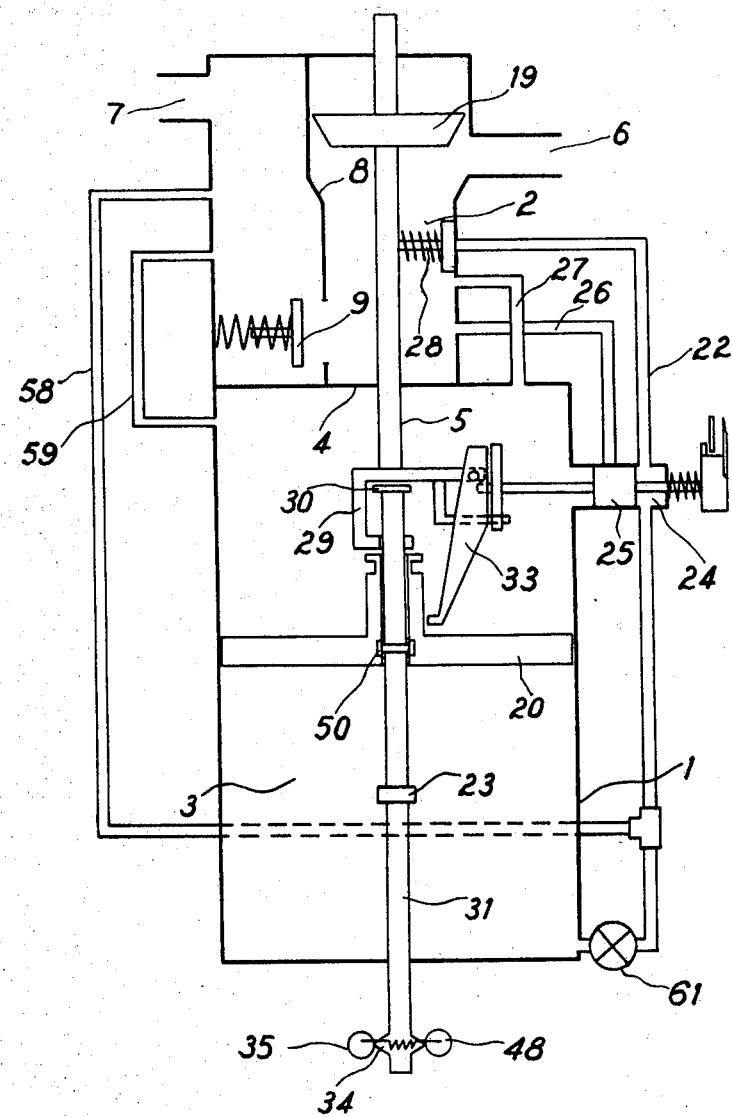

One particular embodiment of the invention will now be described with reference to the accompanying drawings in which similar references indicate corresponding parts, and in which:

FIG. 1 shows, in front elevation, a control or timing device constructed in accordance with the invention, FIG. 2 shows, in plan, a view along the line 2—2 of FIG. 1, FIG. 3 shows, in side elevation and partly in section, a view along the line 3—3 of FIG. 2, FIG. 4 shows, in side elevation, a view along the line 4—4 of FIG. 3, FIG. 5 shows, in side elevation and partly in section, a view along the line 5—5 of FIG. 3, FIG. 6 shows, in side elevation and partly in section, a view along the line 6—6 of FIG. 4, FIG. 7 shows, in front elevation and partly in section, a view along the line 7—7 of FIG. 2, and FIG. 8 is a schematic diagram illustrating the operation of the invention.

Upon referring to the drawings it will be seen that a control or timing device, useful for the passage of water to an irrigation or garden sprinkler system, includes a body 1 with coaxial upper and lower chambers 2 and 3 respectively, each of cylindrical form, the lower being of considerably greater diameter than the upper, and the two being separated by a partition 4. An axial piston rod 5 is mounted slidably in the two chambers, passing through an aperture in said partition via an associated gland if required. A water inlet 6 leads into the side of the cylinder 2 and a water outlet 7 leads from said cylinder. An annular valve seat 8 is provided in the cylinder 2 between the inlet 6 and the outlet 7. The inlet 6 may be provided with a suitable connector to permit its attachment to a threaded tap or the like, and the outlet 7 may be externally threaded so that a hose connector or the like may be fastened thereon. In the region somewhat upstream from the outlet 7 there is provided a suitable spring-loaded valve 9 urged towards its closed position by adjustable spring-loading means so as to produce a pressure difference between the inlet 6 and the outlet 7. This means may comprise the adjustable arrangement of the slug 10, spring 11 and piston 12, all located within the detachable cylinder 13, the outer end of which may be closed by a protective screw cap 14. Said valve 9 is capable of being moved towards its open position by movement of the piston 15 further into the cylinder 16 against the action of the pivoted arm 17 as the latter moves about the pin 18 when the normal pressure of water passes from the inlet 6 by way of the cylinder 2 to the outlet 7. Preferably, the inlet 6 and outlet 7 are both formed integrally with the body 1 as shown.

Upon the upper part of the piston rod 5 is mounted a close-down valve 19, the lower part of which comprises a frustoconical valve adapted when the rod 5 is lowered to its full extent to be brought on to the valve seat 8 to close the way from the inlet 6 to the outlet 7. The mode of entry of the water to the cylinder 2 is such that water pressure from the inlet 6 is directed above the valve 19 as well as below it.

Within the lower cylinder 3, a floating piston 20 is mounted slidably on the rod 31, this piston having a peripheral sealing ring 21 or the like, contacting the inner wall of said cylinder and also a sealing ring or gland 50 between it and the rod 31. The stop collar 23 may be mounted on the rod 31 to limit the slidable movement of the floating piston on this rod as hereinafter described.

Within the upper part of the cylinder 3 is mounted a slide valve assembly best shown in FIGS. 3 and 8. This comprises a valve body 24 within which a hydraulic piston valve 25 is slidable in a direction substantially perpendicular to the axis of the piston rods 5 and 31.

Assuming that the valve 19 is initially fully raised and that the valve 25 is in the position shown, water under pressure may enter the inlet 6, and by virtue of the fact that the spring-loaded valve 28 closes the mouth of the pipe 22, water passes through the cylinder 2 through the pipe 27 to the upper part of the cylinder 3 above the piston 20. Said piston then moves down initially without moving either the rod 5 or the rod 31. When the piston 20 contacts the collar 23, it commences to drag down the rod 31. This action continues until the lower limb of the fork 29 is contacted by the collar 30, thereby dragging down the rod 5 until the spring-loaded valve 28 closes the mouth of the pipe 27, and opens the mouth of the pipe 22 as hereinafter described. This action of said valve cuts off the supply of water to the part of the cylinder 3 above the piston 20 and commences to admit water below the piston 20 via the pipe 22.

The piston 20 then begins to rise with respect to the rod 31 until the collar 32, attached to the rod 31, strikes the underside of the fork 29, thus causing the rod 5 to rise. After a short interval, the fork 29 then contacts the underside of the collar 30 with a rapid action which is due to the fact that the cam 34 on the prolongation of the rod 31 jumps past the spring-loaded rollers 35 and 48 which are preferably mounted upon arms 49 and 50 respectively pivoted by means of the hinges 51 and 52, which are fastened rigidly with respect to the body 1. This causes the rod 5 to jump quickly so that the valve 28 opens the mouth of the pipe 27 and closes the mouth of the pipe 22 with a similar action.

The piston 20 then recommences its downward motion and the cycle repeats. It will be understood that when the piston 20 reaches the bottom of its stroke, the valve 28 closes the mouth of the pipe 27 and opens the mouth of the pipe 22 with a quick action, similar to that above described, owing to the motion of the cam 34 downwardly past the rollers 35 and 48. It will be understood that the valve 28 is not adapted to close the mouth of the pipe 26.

Before commencing the above-described cycle of operations, the control or timing means of the apparatus is set initially rotating outwardly the spring-loaded knob 36 to a position wherein the detent 37 attached to said knob is in register with the slot 38. This causes the pointer 39 which is also attached to the knob 36 to move to the zero or switchoff position on the scale 40. A desired timing period is then preset on said scale by pushing the knob 36 inwards until the detent 37 passes through the notch 38 whereupon a rotation of the knob 37 causes said detent to pass behind the plate 41 and remain in that depressed position until the detent 37 is rotated back to the position of the notch 38 as hereinafter described. At the same time, the action of pushing in the knob 36 causes the ratchet wheel 42 to engage with the spring pawl 43 which is fixed with respect to the upper limb of the fork 29. As a consequence, the reciprocating motion of the fork 29 causes the selective engagement of successive teeth in the ratchet wheel 42 by the pawl 43, and hence the knob 36 causes the pointer 39 to creep back by increments across the scale 40 as the piston 20 reciprocates, until the detent 37 emerges again into the notch 38, thus restoring the timing device to its release position and the pointer 39 to a zero reading.

During the last-mentioned action or total timed period of operation, the pipe 26 is closed by the valve 25 but when said release position is reached, the final stroke of the rod 5 is permitted to take place because the valve 25 closes the pipe 22, and opens the pipe 26. Meanwhile, the pipe 27 is gradually closed by the valve 28 and is then ineffective because flow has commenced in pipe 26. As a consequence, water in the cylinder 3 above the piston 20 pushes said piston right down to the limit of its travel. Meanwhile, the ratchet wheel 42, upon reaching the release position, allows the foot 46 of the rocker-arm 33 to be urged towards the rod 31 under the influence of the spring 44 which tends to turn said rocker-arm about the pivot 45. Hence, when the piston 20 has reached a sufficiently low position, the foot 46 of said rocker-arm enters and engages the notch 47. This, for the first time, causes positive connection between the rod 31 and the rod 5, and hence 5 follows 31 down until the piston 19 rests upon the seat 8, thus closing off the inlet 6 from the outlet 7, and bringing the cycle of operations to a halt at a time which has been preset on the dial 40. It will be understood that throughout the entire timed operation above described the inlet 6 has been in communication with the outlet 7 via the valve 9, and that this condition only ceases when the preset timed period terminates upon the seating of piston 19.

The pipes 58 and 59 are employed as bleed lines to release water from the respective low-pressure sides of the piston 20 to the outlet 7 as the piston changes its direction of travel under the influence of the valve system above described. It will be seen that the pipe 58 is connected to a region of the pipe 22 above the restriction valve 61 which is adjustable to preset a suitable slow rate of reciprocation of the piston 20. This assumes, of course, that a sufficient degree of restriction is provided in pipes 58 and 59 to enable sufficient pressure to be maintained at any time at valve 51.

It will, of course, be understood that the particular embodiment of the invention herein described may be subject to certain modifications which will be apparent to persons skilled in the art, without departing from the ambit of the invention. For example, the floating piston 20 may be replaced by a flexible diaphragm together with a suitable amplitude limiting device. Furthermore, said prolongation of the piston rod 31, or if preferred, a similar prolongation of the rod 5, may be employed as a power or motion takeoff device for a variety of purposes, such as the reeling-in of a hose connected to the outlet 7.

I claim:

1. A flow control device for controlling the flow of fluid over a predetermined interval of time, the device comprising in combination; a body having a fluid inlet, a fluid outlet, a first fluid flow passage extending between said inlet and said outlet, a first valve means movable between opened and closed positions for opening and closing said first passage, means associated with said body defining a chamber, a pressure responsive means dividing the chamber into subchambers on opposite sides of the pressure responsive means, said pressure responsive means being reciprocable in the chamber in response to a pressure differential across the pressure responsive means, control and actuating means for alternately supplying and exhausting said subchambers with fluid for reciprocating said pressure responsive means in said chamber self-cyclically responsive to continued pressure in said flow passage within a certain normal operating stroke and for stopping fluid flow into one of said subchambers to stop reciprocation of said pressure responsive means upon completion of a predetermined number of reciprocations thereof and to subsequently cause said pressure responsive means to move only in one direction towards said one subchamber beyond its normal operating stroke, and coupling means interconnecting said first valve means and said pressure responsive means for maintaining said first valve means in open position during reciprocation of said pressure responsive means and for positively connecting said valve means and said pressure responsive means thereby moving said first valve means to closed position stopping flow between said inlet and said outlet when said pressure responsive means moves in said one direction towards said one subchamber beyond its normal operating stroke responsive to the conclusion of paid predetermined number of reciprocations thereof.

2. The device defined in claim 1 wherein said control and actuating means includes a second valve means movable from a first, preset position permitting flow into said one subchamber to a second position preventing fluid flow into said one subchamber when said pressure responsive means completes a predetermined number of reciprocations.

3. The device defined in claim 2 wherein said control and actuating means further includes a movable ratchet means connected to said second valve means, and a pawl means operatively connected to said pressure responsive means to move in response to movement thereof for driving said ratchet means when in engagement therewith, said ratchet means being engaged with said pawl means when said second valve means is in said preset position thereof and being disengaged from said pawl means when said second valve means is in said second position thereof.

4. The device defined in claim 3 wherein said control and actuating means further includes a second fluid flow passage communicating with said other subchamber, a third fluid flow passage communicating with said one said subchamber, and a fourth fluid flow passage closed by said second valve means when in said preset position thereof but opened into communication with said other subchamber when said second valve means is in said second position thereof, said second valve means also being associated with said third fluid flow passage to open the same to permit communication with said one subchamber when in the preset position thereof and to close said third fluid flow passage to stop fluid flow into said one subchamber through said third fluid flow passage when said second valve means is in said second position thereof, said slide valve means including a rotatable slide valve member, said slide valve member also being longitudinally slidable between said preset and second positions thereof, said ratchet means including a ratchet wheel connected to said slide valve member to be rotatable into a preset timing position upon depression and rotation of said slide valve member.

5. The device defined in claim 3 wherein said second valve means further includes a spring means urging said second valve means to said second position thereof, and means including a releasable detent for energizing said spring means and for retaining said slide means in said preset position until the conclusion of a predetermined number of reciprocations of said pressure responsive means.

6. The device defined in claim 4 wherein there is further included a pressure regulating valve means in said first passage between said first valve means and said outlet to control the fluid flow through said first passage.

7. The device defined in claim 6 wherein said third fluid flow passage has a variable restrictor valve means therein to control the rate of reciprocation of said pressure responsive means.

8. The device defined in claim 7 further including bleed passages leading from said subchambers.

9. The device defined in claim 6 further including spring means releasably urging said pressure regulating valve means to close said first passage at a location between said first valve means and said outlet.

10. The device defined in claim 9 further including means for varying the biasing force of said spring means on said pressure regulating valve means.

11. The device defined in claim 4 wherein said first valve means includes a first actuating stem mounted for reciprocable movement in said first passage, a valve head connected to said first stem to be moved therewith between open and closed positions, said pressure responsive means includes a second valve stem reciprocable in said chamber, said coupling means interconnecting said first and second stems to permit said first actuating stem to reciprocate during reciprocation of said pressure responsive means while maintaining said valve head in open position.

12. The device defined in claim 11 wherein said second, third, and fourth fluid flow passages are communicable with said first passage, and wherein there is further included a third valve means operatively connected to said first stem to be reciprocable thereby to close and open said second and third passages for alternately supplying and exhausting said subchambers.

13. The device defined in claim 12 wherein said pressure responsive means includes a pressure responsive member slidably mounted on said second actuating stem for movement along and relative to said second actuating stem, said second actuating stem having a stop portion thereon engageable by said pressure responsive member to move said second actuating stem in said one direction, said coupling means permitting second actuating stem to move said first actuating stem in said one direction after said pressure responsive means engages said stop portion and continues to move in said one direction and for permitting said pressure responsive means to move said first stem in a direction opposite to said first direction.

14. The device defined in claim 13 wherein there is further included positive connection means mounted with respect to one of said stems for positively engaging the other stem upon the conclusion of a predetermined number of reciprocations of said pressure responsive member for positively interconnecting said stems during movement of said pressure responsive member beyond its normal operating stroke in said one direction for purposes of closing said first valve means.

15. The device defined in claim 14 wherein said positive connection means includes a rocker arm pivotally mounted with respect to said first actuating stem for movement into and out of engagement with said pressure responsive member, a spring means urging said rocker arm in a direction to engage said pressure responsive member, and wherein said ratchet wheel engages said rocker arm to space it from said pressure responsive member against the bias of said last defined spring means when said slide valve member is in said preset position thereof, said ratchet wheel releasing said rocker arm when said slide valve member moves to said second position thereof to allow said last recited spring means to pivot said rocker arm into engagement with said pressure responsive member for positively interconnecting said first and second stems.

16. The device defined in claim 18 wherein said bleed passages open into said first passage between said pressure regulating valve means and said outlet.

17. The device defined in claim 13 wherein said pressure responsive member is a piston.

18. The device defined in claim 1 wherein said pressure responsive means is a diaphragm.

19. The device defined in claim 13 wherein said coupling means includes a fork member fixed to said first stem and having a passage slidably receiving said second stem, said second stem having an enlarged portion located between said first stem and said fork member to be engageable with said fork member to move said first stem in said one direction.

20. The device defined in claim 19 wherein said pressure responsive member is engageable with said fork member for moving said first stem in a direction opposite to said one direction.

21. A flow control device for controlling the flow of fluid over a predetermined interval of time, the device comprising in combination, a body having a fluid inlet, a fluid outlet, and a fluid flow passage extending between said inlet and outlet, valve means mounted in the body for movement between open positions opening said passage to permit flow between said inlet and said outlet and a closed position closing said passage to prevent flow between said inlet and said outlet, actuating means for repetitively reciprocating said valve means in said passage responsive to continued pressure in said fluid flow passage while maintaining said valve means in open position permitting flow between said inlet and said outlet, a timing means including ratchet means having a timing movement and pawl means engageable with the ratchet means to drive the same throughout the timing movement thereof, one of said ratchet and pawl means being connected to said valve means to reciprocate therewith for driving said ratchet means throughout its timing movement, said actuating means including means for moving said valve means to closed position preventing flow between said inlet and said outlet when said ratchet means concludes its timing movement.

22. The device defined in claim 21 further including means for biasing said pawl and ratchet means away from each other to disengage the same, and detent means for maintaining said pawl and ratchet means in driving engagement with each other and for releasing said pawl and ratchet means for permitting said spring means to disengage them when said ratchet means concludes its timing movement.